Patented Sept. 1, 1925.

1,552,051

UNITED STATES PATENT OFFICE.

WILLIAM H. CRUME, OF DAYTON, OHIO.

PROCESS OF MAKING BUILDING MATERIALS.

No Drawing. Original application filed January 26, 1924, Serial No. 688,860. Divided and this application filed October 3, 1924. Serial No. 741,398.

*To all whom it may concern:*

Be it known that I, WILLIAM H. CRUME, a citizen of the United States, residing at Dayton, in the county of Montgomery and State of Ohio, have invented certain new and useful Improvements in Processes of Making Building Materials, of which the following is a specification.

My invention relates to a process of making building materials, and is a division of an application filed by me January 26, 1924, Ser. No. 688,860.

It is the object of my invention to provide a process for making a building material which has both strength and heat resisting qualities. It is my object to provide such a process for making a material which has tenacity and some degree of plasticity, so that objects can be nailed to it or otherwise attached just as in the case of wood. It is my object to provide such a process for making a material which is fireproof and adaptable for use in furnaces, fire walls and heat insulating structures. It is my object to provide such a process for making a material which not only has these qualities, but also can carry the load as well, thus eliminating considerable material which is now used, as in the present state of the art it is necessary to use one material for heat insulation and another material for carrying the load.

It is a further object of my invention to provide a process for making a building material which will utilize waste products which will require the minimum of materials which must be shipped from given deposits and which may be easily and quickly carried out with standard equipment.

It is my object to provide a process for making a building material which has these qualities and at the same time has the light weight which is essential for shipment. It is my object to provide light weight because of the obvious advantage in the handling of the material in the actual construction of buildings with the result that the work of construction will be materially expedited and cheapened.

It is my object to provide a process for making a building material which is of such a character that door jambs, window frames and the like may be directly nailed to it without the necessity of wood inserts or the like which are commonly employed in connection with clay, tile and other similar ceramic materials.

For the practice of my invention I select the refuse from the boilers after the burning of coal, or slag which is the molten impurities from iron, steel, copper and other metals and glass furnaces, which has been subjected to water in molten condition with the result that it has broken up into granulated slag.

When the cinders are used from furnaces, these cinders are washed to remove from the cinders the ash, traces of acids and the coke. The coke is salable and forms a profitable byproduct, or it may be used in the furnaces of the plant practicing this invention.

The result of this washing process is to leave the clinker residue.

The reason for removing the ash is that it would interfere with the bond between the lime and silica in the clinkers and in the kieselguhr which would weaken the structure of the material when finished. The coke must be removed as the insulating material may be subjected to temperatures as high as 2,000 degrees Fahrenheit. If the coke were present it would burn out and leave large voids, thus greatly decreasing the effectiveness of the insulating qualities of the brick. The coke would also tend to disintegrate into powder during the grinding or crushing operation, thus greatly decreasing the strength of the bond formed by the lime acting on the silica in the mass as hereinafter described.

In the description of my invention and the claiming thereof, it will be understood that either the granulated slag or the clinker, or any other rough granular material which is inert to the usual heat ranges in which the material may be employed may be used. The clinker and slag or a similar material should have this strong granular physical structure, thus providing a plurality of interstices or minute passageways for air and a rough clinging surface which will promote the bonding of the materials with one another. Such material should have a silica content which also facilitates the bonding action and the imprisoning of air in the mass.

Having selected some such material I mix with it kieselguhr or any variety of diatomaceous earth. This material is characterized by its high silica (SiO$_2$) content, which ranges from 65 to 95 per cent. There may be present certain lime and magnesia, the lime running up to as much as seven percent. This material is further characterized by the fact that it is susceptible of being very minutely divided, thus being capable of the most intimate mixture with the slag or clinker and the lime and being able to penetrate the interstices of the granular material for a purpose to be hereafter described. Its principal characteristic is its discontinuity because of the contained air, its actual volume usually being about one-fifth of the total area occupied, so that it is an efficient heat insulator for temperatures from 200 to 2,000 degrees Fahrenheit. It is also chemically inert. Its bulk and its light weight, however, make its use profitable for most purposes and its shipment easy. It also lacks strength so that it cannot be used for supporting any appreciable load.

This finely divided material is intimately mixed with the granular material such as the slag or clinker. The mass is then thoroughly mixed with hydrated lime, sufficient water being added to give the whole some plasticity. The lime is powdered hydrate, but it also may be used in a moist hydrated condition or introduced into the mixture as powdered quicklime, allowing the moisture in the mass to hydrate the lime. In such an event the mass is held in containers until the hydration is complete. Upon getting the mass in suitable condition it is formed into building materials such as brick, slabs, blocks and tiles, or any other form desired.

The shapes may be formed either by pressing or tamping or by any other method found advisable in the art. It is not necessary, however, to apply great pressure and this expense may be eliminated.

The shapes so formed are then placed in a closed retort and are subjected to live steam. The preferable pressure of the steam is approximately 120 pounds and this pressure should be continued from four to six hours. It will be understood, however, that both higher and somewhat lower pressures can be used. About eighty pounds pressure is the minimum that is effective. The time in the retort can also be varied by the time indicated in the preferred interval.

In treating the slag or clinker in order to insure the proper size of material it is preferable to grind or crush it so that it will pass through a 3/4" mesh screen prior to mixing with kieselguhr and lime.

The effect of the mixing and packing in forms is to coat and surround the particles of the granulated slag with the moistened powders of kieselguhr and lime and to fill the spaces between the larger granular particles, thus forming a solid structure composed of the porous granulated slag or clinker surrounded and partially sealed by the kieselguhr, which in itself encloses minute air cells. The lime acts on the silica of the slag or clinker and the kieselguhr to form a bond.

The steam at high pressure causes the lime in the mass to react upon the silica so that a gelatinous bond is formed, not only cementing the particles to one another, but imprisoning the minute portions of the air in airtight cells, thus forming a material having high heat resisting qualities, while the material has great strength due to the slag or clinker content.

In mixing the materials I have found that I may use combinations of eighty parts by volume of powdered kieselguhr, twenty parts of granulated slag and twelve to thirty parts of hydrated lime powder, or I may vary the mixture by reducing the proportions of kieselguhr and changing the proportions of the other materials through varying combinations until the kieselguhr is reduced to ten parts by volume, the granulated slag is increased to ninety parts by volume and the hydrated lime powder is present from ten to twenty parts by volume. The increase in the slag, and in referring to slag all similar materials are included, the strength of the material is increased. When the kieselguhr is comparatively low the product is strong enough to be used in walls and floors of buildings, between studding, and the heat insulation of boilers and furnaces, and can be so employed that the usual additional supporting wall and the extra space it occupies can be eliminated entirely. If the kieselguhr content is increased over 40 percent of the mass, the material will not be sufficiently strong for carrying the load bearing walls, but its heat resisting qualities will be increased.

It will be understood that in the practice of my process and in the composition of my new article of manufacture I do not desire to confine myself to the details of temperatures, proportions of mixture, or specific material, or methods of handling, as I desire to comprehend within my invention the usual and necessary modifications which may be found proper in adapting it to varying conditions and to the use of materials having the physical and chemical characteristics which have been indicated.

Having thus fully described my invention, what I claim as new and desire to secure by Letters Patent of the United States, is:

1. In a process of manufacturing building material, selecting a relatively strong granular material such as slag, mixing with it a diatomaceous earth finely divided, mixing in the mass hydrated lime with sufficient water to give plasticity thereto, forming the mass into shapes and subjecting the shapes in a closed retort to live steam at high pressure.

2. In a process of manufacturing building material, selecting granulated slag or clinker, reducing it to size by grinding or crushing, mixing with it a finely powdered diatomaceous earth such as kieselguhr, mixing with the mass hydrated lime and adding water to give plasticity to the mass, forming the mass into shapes and subjecting the shapes to live steam at high pressure in a closed retort.

3. In a process of manufacturing building material selecting granulated slag or clinker, reducing it to size by grinding or crushing, mixing with it a finely powdered diatomaceous earth such as kieselguhr, mixing with the mass hydrated lime and adding water to give plasticity to the mass, forming the mass into shapes and subjecting the shapes to live steam at high pressure in a closed retort, said steam being maintained at from eight to 120 pounds pressure approximately for a period of approximately four to six hours.

4. In a process of making a building material, washing the residue from coal burning furnaces, separating the ash therefrom, recovering the coke and removing by the washing objectionable traces of acids and the like, reducing the resulting clinkers to size, mixing with kieselguhr, hydrated lime and water, and subjecting the mass to live steam under high pressure in a closed retort.

5. In a process of making a building material, washing the residue from coal burning furnaces, separating the ash therefrom, recovering the coke and removing by the washing objectionable traces of acids and the like, reducing the resulting clinkers to size, mixing with kieselguhr, hydrated lime and water, and subjecting the mass to live steam under high pressure in a closed retort, said steam pressure being approximately 120 pounds and the period of treatment being approximately four to six hours.

In testimony whereof, I affix my signature.

WILLIAM H. CRUME.